US009713820B2

(12) United States Patent
Humfeld et al.

(10) Patent No.: US 9,713,820 B2
(45) Date of Patent: Jul. 25, 2017

(54) SYSTEM AND METHOD OF FORMING A NANOTUBE MESH STRUCTURE (71) Applicant: The Boeing Company, Seal Beach, CA (US)

(72) Inventors: Keith Daniel Humfeld, Federal Way, WA (US); Mark Stewart Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 282 days.

(21) Appl. No.: 14/293,092

(22) Filed: Jun. 2, 2014

(65) Prior Publication Data
US 2015/0343483 A1 Dec. 3, 2015

(51) Int. Cl.
*B05C 3/02* (2006.01)
*B05D 1/18* (2006.01)
*B05D 1/28* (2006.01)
*B82Y 30/00* (2011.01)
*C01B 31/02* (2006.01)

(52) U.S. Cl.
CPC ............ *B05C 3/02* (2013.01); *B05D 1/18* (2013.01); *B05D 1/28* (2013.01); *B82Y 30/00* (2013.01); *C01B 31/0253* (2013.01); *C01B 2202/08* (2013.01)

(58) Field of Classification Search
None
See application file for complete search history.

(56) References Cited

U.S. PATENT DOCUMENTS

| 3,852,012 | A | * | 12/1974 | Pfeiffer | B29C 43/22 425/335 |
| 4,802,837 | A | * | 2/1989 | Held | B27N 3/08 425/230 |
| 5,372,493 | A | * | 12/1994 | Rodgers | B29C 39/16 100/151 |
| 6,781,166 | B2 | | 8/2004 | Lieber et al. | |
| 8,455,055 | B1 | | 6/2013 | Humfeld | |
| 2003/0044608 | A1 | | 3/2003 | Yoshizawa et al. | |

(Continued)

FOREIGN PATENT DOCUMENTS

CN 103342351 A 10/2013

OTHER PUBLICATIONS

EPO Extended Search Report for related application 15168861.1 dated Oct. 22, 2015; 4 pp.

*Primary Examiner* — Charles Capozzi
(74) *Attorney, Agent, or Firm* — Armstrong Teasdale LLP (57) ABSTRACT A system for use in producing a nanotube mesh structure is provided. The system includes a first nanotube collection apparatus including a first substrate configured to collect a plurality of nanotubes substantially aligned in a first orientation on an attachment surface thereof, and a second nanotube collection apparatus including a second substrate configured to collect a plurality of nanotubes substantially aligned in a second orientation on an attachment surface thereof. The first and second nanotube collection apparatuses are configured to combine the pluralities of nanotubes at an interface. The system also includes a first energy source configured to direct energy towards the interface between the pluralities of nanotubes, wherein the energy is configured to join the pluralities of nanotubes to form the nanotube mesh structure.

7 Claims, 6 Drawing Sheets (56) References Cited

U.S. PATENT DOCUMENTS

2009/0110897 A1  4/2009 Humfeld et al.
2010/0080975 A1  4/2010 Liang et al.
2012/0251794 A1  10/2012 Miao

* cited by examiner

SYSTEM AND METHOD OF FORMING A NANOTUBE MESH STRUCTURE

BACKGROUND

The field of the present disclosure relates generally to nanotube technology and, more particularly, to systems and methods of forming a nanotube mesh structure.

Carbon nanotubes are small tube-shaped structures fabricated essentially from single-atom thick sheets of graphene in tubular form. Generally, carbon nanotubes can be classified as either single-wall or multi-wall carbon nanotubes. Single-wall carbon nanotubes have only one cylindrical graphitic layer, and multi-wall carbon nanotubes have two or more nested cylindrical graphitic layers. Carbon nanotubes generally have a diameter less than about 100 nanometers and large aspect ratios such that a length of the nanotube is significantly greater than its diameter. For example, the length to diameter ratio of carbon nanotubes may be greater than about 1000 to 1. Moreover, carbon nanotubes have been shown to exhibit high strength, unique electrical properties, and to be efficient conductors of heat. Such features make carbon nanotubes advantageous for use in a variety of mechanical, electrical, and/or thermal applications.

However, the use of carbon nanotubes in practical applications is generally limited by the small size of the carbon nanotubes. Recently, several known processes have been established to form carbon nanotube structures of increasingly large sizes that may be implemented in such practical applications. One known process includes dispersing carbon nanotubes in a bath of solution, substantially aligning the carbon nanotubes in the solution, and iteratively collecting the carbon nanotubes on a surface of a substrate passing through the bath of solution. The carbon nanotubes are generally iteratively collected in different orientations of the substrate. The carbon nanotubes accumulated on the surface of the substrate are then joined to form a carbon nanotube mesh structure, or "buckypaper." However, the size of carbon nanotube mesh structures formed in such processes is generally limited by the dimensions of the substrate and/or the bath of solution.

BRIEF DESCRIPTION

In one aspect, a system for use in producing a nanotube mesh structure is provided. The system includes a first nanotube collection apparatus including a first substrate configured to collect a plurality of nanotubes substantially aligned in a first orientation on an attachment surface thereof, and a second nanotube collection apparatus including a second substrate configured to collect a plurality of nanotubes substantially aligned in a second orientation on an attachment surface thereof. The first and second nanotube collection apparatuses are configured to combine the pluralities of nanotubes at an interface. The system also includes a first energy source configured to direct energy towards the interface between the pluralities of nanotubes, wherein the energy is configured to join the pluralities of nanotubes to form the nanotube mesh structure.

In another aspect, an apparatus for use in collecting nanotubes is provided. The apparatus includes a bath of solution including a plurality of nanotubes floating on a surface of the solution, and a feed system configured to continuously direct a substrate including an attachment surface past the surface of the solution. The plurality of nanotubes couple to the attachment surface in a substantially parallel orientation as the feed system directs the attachment surface past the surface of the solution.

In yet another aspect, a method of forming a nanotube mesh structure is provided. The method includes continuously directing a substrate including an attachment surface past a surface of a bath of solution including a plurality of nanotubes floating on a surface of the solution such that the plurality of nanotubes couple to the attachment surface in a first orientation, combining the plurality of nanotubes in the first orientation with a plurality of nanotubes in a second orientation, the pluralities of nanotubes combined at an interface defined therebetween, and thermally coupling the pluralities of nanotubes at the interface to form the nanotube mesh structure.

DETAILED DESCRIPTION

The implementations described herein relate to systems and methods of producing a carbon nanotube mesh structure. In the exemplary implementation, the system includes a Langmuir-Blodgett type apparatus including a bath of solution having a plurality of nanotubes floating on a surface of the solution. The system also includes conveyor feed systems that substantially continuously direct a flexible, elongated substrate past the surface of the solution such that the nanotubes couple to the substrate. The nanotubes from a first conveyor feed system are combined with the nanotubes from a second conveyor feed system to form the nanotube mesh structure. By substantially continuously coupling nanotubes to substrates of the conveyor feed systems, a substantially continuous nanotube mesh structure is formed when the nanotubes are combined. As such, the system described herein facilitates substantially continuous production of the nanotube mesh structure whose size is only limited in one dimension (i.e., a width of the substrate).

Figure 1:
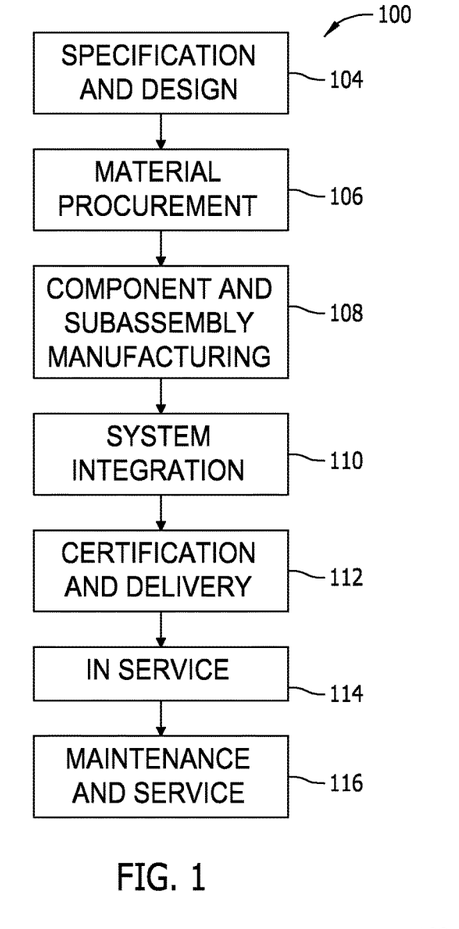
FIG. 1 is a flow diagram of an exemplary aircraft production and service method.
Figure 2:
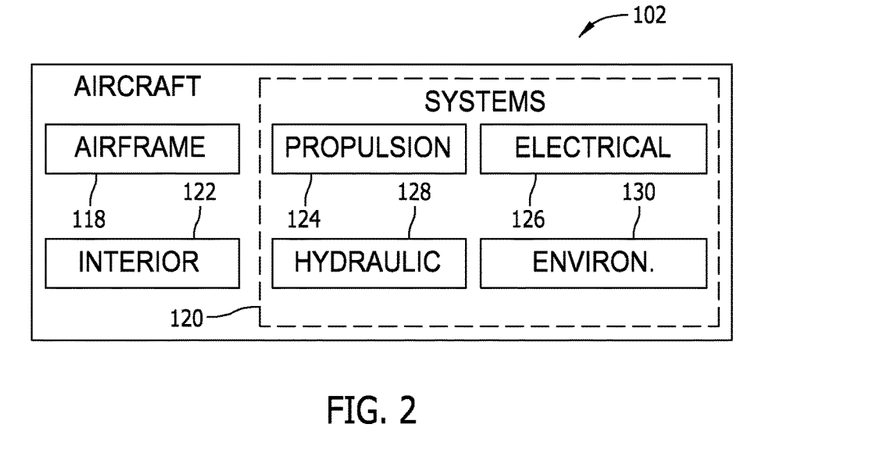
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
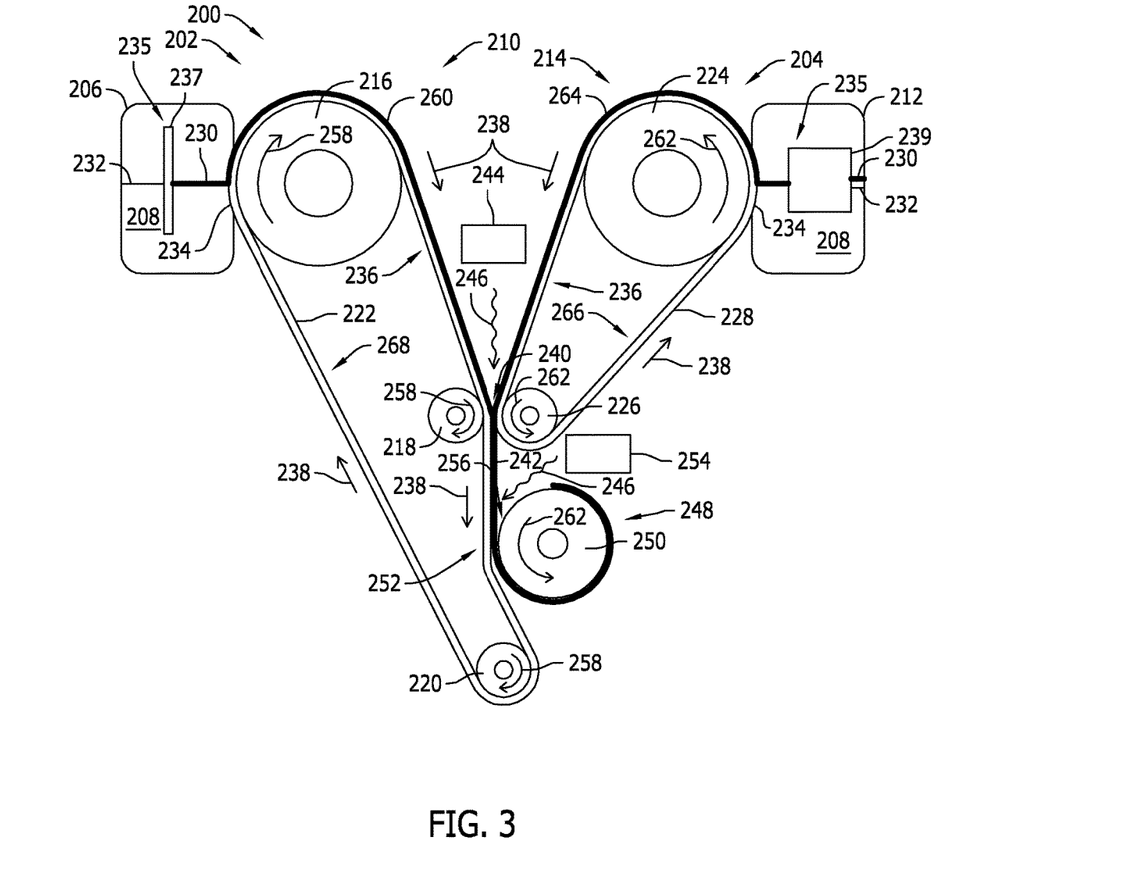
FIG. 3 is a schematic illustration of an exemplary nanotube mesh structure production system.

FIG. 3 is a schematic illustration of an exemplary nanotube mesh structure (NMS) production system 200. In the exemplary implementation, NMS production system 200 includes a first nanotube collection apparatus 202 and a second nanotube collection apparatus 204. First nanotube collection apparatus 202 includes a first bath 206 of solution 208 and a first conveyor feed system 210 operable with first bath 206, and second nanotube collection apparatus 204 includes a second bath 212 of solution 208 and a second conveyor feed system 214 operable with second bath 212. Specifically, first conveyor feed system 210 includes a first collection roller 216, a first bonding roller 218, a tensioning roller 220, and a first flexible substrate 222 coupled about rollers 216, 218, and 220. Second conveyor feed system 214 includes a second collection roller 224, a second bonding roller 226, and a second flexible substrate 228 coupled about rollers 224 and 226.

In the exemplary implementation, first and second collection rollers 216 and 224 are positioned adjacent to first and second baths 206 and 212 such that first and second substrates 222 and 228 contact respective baths 206 and 212 of solution 208. Each bath 206 and 212 includes a plurality of nanotubes 230 floating on a surface 232 of solution 208. As such, first and second substrates 222 and 228 collect nanotubes 230 on attachment surfaces 234 thereof as collection rollers 216 and 224 direct first and second substrates 222 and 228 past surfaces 232 of solution 208. Moreover, first and second nanotube collection apparatuses 210 and 214 are operable to facilitate substantially aligning nanotubes 230 on each substrate 222 and 228 in different, substantially parallel orientations. For example, as will be described in more detail below, collection apparatuses 202 and 204 include pre-alignment devices 235 that facilitate aligning nanotubes 230 within each bath 206 and 212 of solution 208.

Solution 208 may be any solution that enables NMS production system 200 to function as described herein. For example, solution 208 is selected to have sufficient surface tension that enables nanotubes 230 to be substantially aligned as a surface area (not shown) of surface 232 is modified. An exemplary solution includes, but is not limited to, an aqueous surfactant solution.

First and second bonding rollers 218 and 226 are positioned downstream from baths 206 and 212 of solution 208 such that first portions 236 of first and second substrates 222 and 228 have nanotubes 230 collected thereon. As used herein, "downstream" refers to a direction 238 of NMS production flow along each conveyor feed system 210 and 214. Bonding rollers 218 and 226 are positioned adjacent to each other such that substrates 222 and 228 converge to force nanotubes 230 on each substrate 222 and 228 into contact at a first interface 240 defined therebetween. As such, nanotubes 230 from each substrate 222 and 228 are used to form a nanotube mesh structure (NMS) 242 being discharged from bonding rollers 218 and 226.

NMS production system 200 also includes a first energy source 244 that facilitates joining nanotubes 230 to form NMS 242. Specifically, first energy source 244 directs energy 246 towards first interface 240 to thermally couple nanotubes 230 at first interface 240 together. First energy source 244 may be any source of energy that enables NMS production system 200 to function as described herein. Exemplary energy sources include, but are not limited to, an x-ray energy source, a visible light energy source, an infra-red energy source, an ultra-violet energy source, and/or an electron beam energy source. In an alternative implementation, nanotubes 230 are thermally coupled by heating bonding rollers 218 and 226 such that the heat is transferred to nanotubes 230 through first and second substrates 222 and 228 at first interface 240.

In the exemplary implementation, NMS production system 200 includes a NMS collection device 248 coupled downstream from first interface 240. Specifically, NMS collection device 248 includes a take-up roller 250 coupled, either directly or indirectly, to a second portion 252 of first substrate 222 including NMS 242. Take-up roller 250 presses against second portion 252 to facilitate releasing NMS 242 from first substrate 222. As such, take-up roller 250 collects a substantially continuous NMS 242 formed at first interface 240 and discharged from bonding rollers 218 and 226. Moreover, tensioning roller 220 is coupled downstream from take-up roller 250. Tensioning roller 220 ensures first substrate 222 remains pressed against take-up roller 250, and ensures first substrate 222 remains in tension about rollers 216, 218, and 220.

In some implementations, a second energy source 254 is used to produce a multi-layer nanotube mesh structure (NMS) (not shown). Specifically, second energy source 254 directs energy 246 towards a second interface 256 defined between a portion of NMS 242 still coupled to first substrate 222, and a portion of NMS 242 already coupled to take-up roller 250. As such, the number of layers in the multi-layer NMS is selected as a function of rotation of take-up roller 250. Moreover, in one implementation, take-up roller 250 is translateable along its axis of rotation (not shown), which facilitates production of a tubular, multi-layer nanotube mesh structure (not shown). The number of NMS layers in the tubular, multi-layer nanotube mesh structure is selected as function of a rotational speed of take-up roller 250 and/or a translation speed of take-up roller 250 along its axis of rotation. As such, the multi-layer NMS may be formed with or without the use energy 246 from second energy source 254.

In operation, a first pre-alignment device 237 forces nanotubes 230 in first bath 206 against attachment surface 234 of first substrate 222. As will be described in more detail below, first pre-alignment device 237 ensures nanotubes 230 coupled to first substrate 222 are substantially aligned in a first orientation (not shown in FIG. 3). First collection roller 216 then rotates in a first rotational direction 258 to draw nanotubes 230 from solution 208 and to form a first layer 260 of nanotubes 230 on first substrate 222.

As first nanotube collection apparatus 202 collects nanotubes 230 on first substrate 222, second nanotube collection apparatus 204 operates substantially simultaneously to collect nanotubes 230 on second substrate 228. Specifically, second collection roller 224 rotates in a second rotational direction 262 to draw nanotubes 230 from solution 208 and to form a second layer 264 of nanotubes 230 on second substrate 228. As will be described in more detail below, second collection roller 224 draws nanotubes 230 from second bath 212 at a rate that facilitates substantially aligning nanotubes 230 coupled to second substrate in a second orientation (not shown in FIG. 3). In some implementations, a second pre-alignment device 239 in second bath 212 facilitates pre-aligning nanotubes 230 in the second orientation before second collection roller 224 draws nanotubes 230 from second bath 212.

First and second collection rollers 216 and 224 substantially continuously rotate such that first and second substrates 222 and 228 direct layers 260 and 264 of nanotubes 230 towards bonding rollers 218 and 226. As first and second layers 260 and 264 reach first interface 240, first energy source 244 is activated to direct energy 246 towards first interface 240. In the exemplary implementation, a rate at which first and second layers 260 and 264 are directed towards bonding rollers 218 and 226, and/or an intensity of energy 246 are selected to ensure nanotubes 230 from each layer 260 and 264 thermally couple to each other to form NMS 242. NMS 242 is then directed downstream towards take-up roller 250. More specifically, NMS 242 remains coupled to first substrate 222, and second portion 266 of second substrate 228 releases NMS 242 and is substantially free of nanotubes 230. Second portion 266 of second substrate 228 is then redirected towards second bath 212 to enable additional nanotubes 230 to be collected on second substrate 228.

In some implementations, first and second substrates 222 and 228 are fabricated from different materials to enable NMS 242 to remain coupled to first substrate 222, and to enable NMS 242 to be released from second substrate 228. Alternatively, first and/or second substrates 222 and 228 have a surface treatment or have a different surface roughness such that NMS 242 adheres better to first substrate 222 than to second substrate 228.

As described above, take-up roller 250 presses against first substrate 222 and/or NMS 242 coupled to first substrate 222 to collect a substantially continuous NMS 242 thereon. Specifically, NMS 242 couples to take-up roller 250, and take-up roller 250 rotates in second rotational direction 262 to facilitate uncoupling NMS 242 from first substrate 222. A third portion 268 of first substrate 222 is then redirected towards first bath 206 to enable additional nanotubes 230 to be collected on first substrate 222. As such, first and second substrates 222 and 228 are fabricated from any resilient material capable of substantially continuous use in NMS production system 200. In an alternative implementation, first and second substrates 222 and 228 are fabricated from a disposable and/or single use material.

Figure 4:
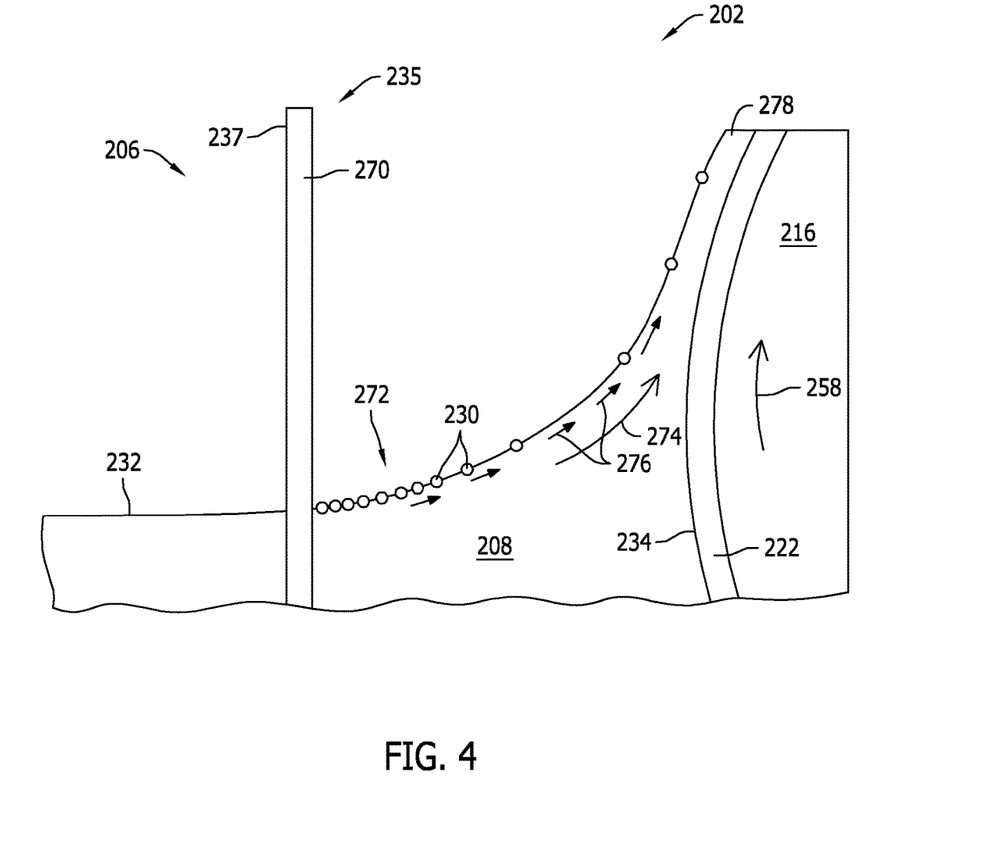
FIG. 4 is an enlarged schematic illustration of an exemplary first nanotube collection apparatus that may be used with the nanotube mesh structure production system shown in FIG. 3.
Figure 5:
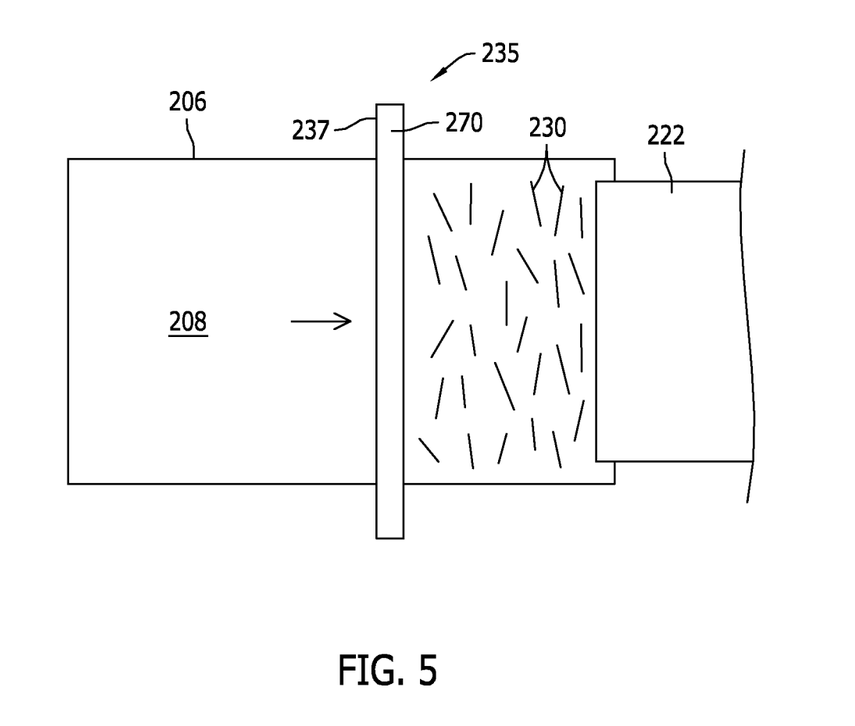
FIG. 5 is a top view of an exemplary pre-alignment device that may be used with the first nanotube collection apparatus shown in FIG. 4.

FIG. 4 is an enlarged schematic illustration of first nanotube collection apparatus 202, and FIG. 5 is a top view of first pre-alignment device 237. In the exemplary implementation, first pre-alignment device 237 includes a moveable arm 270 at least partially submerged in first bath 206 of solution 208. Specifically, moveable arm 270 extends at least partially below surface 232 of solution 208 to enable moveable arm 270 to substantially align nanotubes 230 floating on surface 232 in a first orientation 272 against first substrate 222. For example, moveable arm 270 translates towards first substrate 222, which causes nanotubes 230 to align in a substantially parallel orientation relative to each other.

Moreover, first orientation 272 is defined by nanotubes 230 extending transversely relative to a direction 274 of solution 208 being drawn from first bath 206 by first substrate 222. Specifically, attachment surface 234 of first substrate 222 is directed past surface 232 within first bath 206 at a rate that forms a velocity gradient 276 within solution 208. As such, a film 278 of solution 208 including nanotubes 230 substantially aligned in first orientation 272 is drawn from first bath 206 and coupled to attachment surface 234 of first substrate 222.

Figure 6:
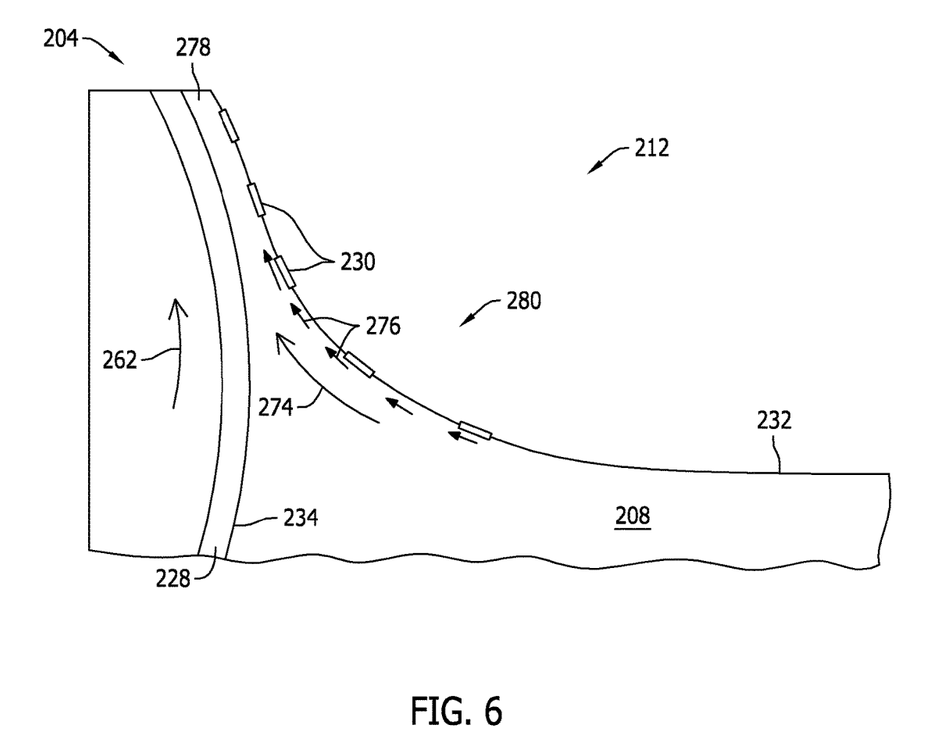
FIG. 6 is an enlarged schematic illustration of an exemplary second nanotube collection apparatus that may be used with the nanotube mesh structure production system shown in FIG. 3.
Figure 7:
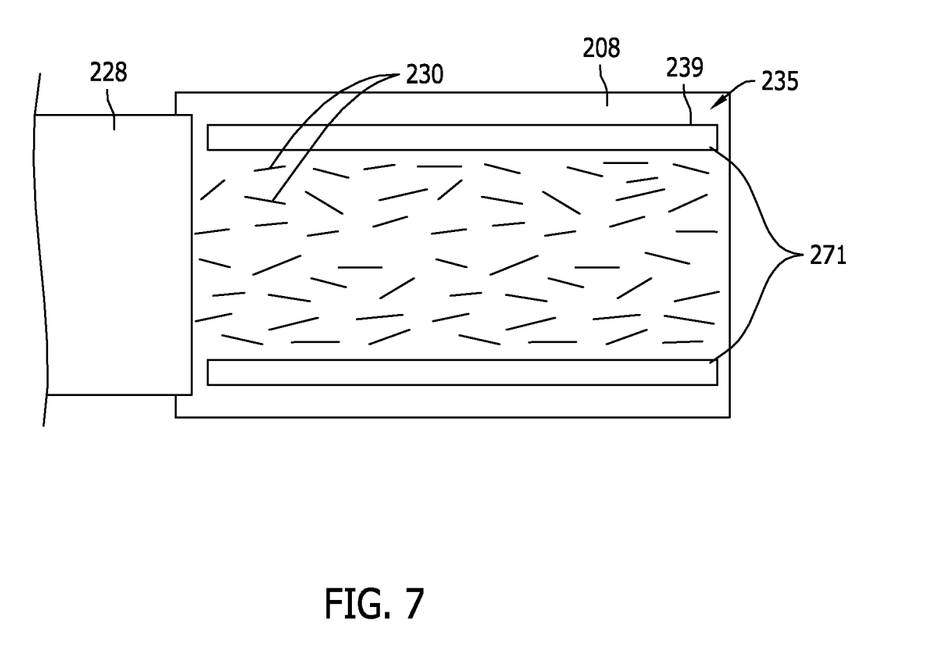
FIG. 7 is a top view of an alternative pre-alignment device that may be used with the second nanotube collection apparatus shown in FIG. 6.

FIG. 6 is an enlarged schematic illustration of second nanotube collection apparatus 204, and FIG. 7 is a top view of second pre-alignment device 239 that may be used with second nanotube collection apparatus 204. In the exemplary implementation, rotation of second substrate 228 and/or second collection roller 224 in second rotational direction 262 causes nanotubes 230 floating on surface 232 of second bath 212 to substantially align in a second orientation 280. Second orientation 280 is defined by nanotubes 230 extending substantially parallel relative to direction 274 of solution 208 being drawn from second bath 212 by second substrate 228. Specifically, attachment surface 234 of second substrate 228 is directed past surface 232 within second bath 212 at a rate that forms velocity gradient 276 within solution 208. As such, film 278 of solution 208 including nanotubes 230 substantially aligned in second orientation 280, and aligned substantially parallel to each other, is drawn from second bath 212 and coupled to attachment surface 234 of second substrate 228.

Referring to FIG. 7, in some implementations, second pre-alignment device 239 facilitates pre-aligning nanotubes 230 in second orientation 280 before being drawn from second bath 212 by second substrate 228. Specifically, second pre-alignment device 239 includes a pair of moveable arms 271 that extend at least partially below surface 232 of solution 208 to enable moveable arms 271 to substantially align nanotubes 230 floating on surface 232 in second orientation 280. For example, moveable arms 271 translate towards each other, which causes nanotubes 230 to align in a substantially parallel orientation relative to each other.

The implementations described herein relate to a nanotube mesh structure production system having a larger production capacity than other known systems. The system includes first and second nanotube collection apparatuses that operate substantially simultaneously to collect nanotubes in differing orientations, and to combine the nanotubes to form the nanotube mesh structure. Each nanotube collection apparatus also operates substantially continuously to enable a substantially continuous nanotube mesh structure to be formed. Moreover, the system includes a nanotube mesh structure collection device that facilitates forming a multi-layer nanotube mesh structure from the substantially continuous mesh structure. As such, the systems and methods described herein facilitate efficient production of nanotube mesh structures that may be implemented in various practical applications.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in producing a nanotube mesh structure, said system comprising:
   a first nanotube collection apparatus comprising:
      a first bath of solution; and
      a first substrate configured to collect a plurality of nanotubes from said first bath of solution, wherein the first substrate includes an attachment surface directed past a surface of the solution in said first bath at a rate that causes the plurality of nanotubes to substantially align in a first orientation on said attachment surface, wherein the first orientation corresponds to a direction of the solution being drawn from said first bath;
   a second nanotube collection apparatus comprising a second substrate configured to collect a plurality of nanotubes substantially aligned in a second orientation on an attachment surface thereof, wherein said first and second nanotube collection apparatuses are configured to combine the pluralities of nanotubes at an interface; and
   a first energy source configured to direct energy towards the interface between the pluralities of nanotubes, wherein the energy is configured to join the pluralities of nanotubes to form the nanotube mesh structure.

2. The system in accordance with claim 1, wherein said first and second nanotube collection apparatuses operate substantially simultaneously.

3. The system in accordance with claim 1, wherein said first and second nanotube collection apparatuses are configured to substantially continuously direct layers of nanotubes towards the interface.

4. The system in accordance with claim 1 further comprising a nanotube mesh structure collection device comprising a take-up roller coupled downstream from the interface, said take-up roller configured to collect the nanotube mesh structure formed at the interface as said take-up roller rotates.

5. The system in accordance with claim 1, wherein a first portion of said first substrate upstream from the interface includes a first layer of nanotubes, and a second portion of said first substrate downstream from the interface includes the nanotube mesh structure.

6. The system in accordance with claim 1, wherein a first portion of said second substrate upstream from the interface includes a second layer of nanotubes, and a second portion of said second substrate downstream from the interface is substantially nanotube free.

7. The system in accordance with claim 1, wherein said first energy source is configured to thermally couple the pluralities of nanotubes together at the interface to form the nanotube mesh structure.

* * * * *